US012624592B2

(12) United States Patent
Swartzmiller

(10) Patent No.: US 12,624,592 B2
(45) **Date of Patent: *May 12, 2026**

(54) DOOR SYSTEM WITH OUTER DOOR FRAME PRE-WIRED WITH AC ELECTRICAL POWER FOR CONNECTION WITH DC POWER SUPPLY UNIT, AND RELATED METHODS OF USE, INSTALLATION, AND FABRICATION

(71) Applicant: Masonite Corporation, Tampa, FL (US)

(72) Inventor: Steven Swartzmiller, Batavia, IL (US)

(73) Assignee: Masonite Corporation, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/864,059

(22) PCT Filed: May 15, 2023

(86) PCT No.: PCT/US2023/022252

§ 371 (c)(1),
(2) Date: Nov. 8, 2024

(87) PCT Pub. No.: WO2023/220474

PCT Pub. Date: Nov. 16, 2023

(65) Prior Publication Data

US 2025/0297515 A1 Sep. 25, 2025

Related U.S. Application Data

(60) Provisional application No. 63/341,450, filed on May 13, 2022.

(51) Int. Cl.

*E06B 7/28* (2006.01)
*E06B 1/52* (2006.01)

(52) U.S. Cl.

CPC ................ *E06B 7/28* (2013.01); *E06B 1/528* (2013.01)

(58) Field of Classification Search

CPC ...................................................... E06B 1/528

See application file for complete search history.

(56) References Cited

U.S. PATENT DOCUMENTS 4,445,299 A * 5/1984 Lehikoinen ............ H01R 35/02 439/31
4,777,570 A 10/1988 Littles
(Continued)

FOREIGN PATENT DOCUMENTS

AU 2020101466 A4 8/2020
CN 200968110 Y 10/2007
(Continued)

OTHER PUBLICATIONS

International Search Report and Written Opinion for International Application No. PCT/US2023/022252; International Filing Date May 15, 2023; Report Mail Date Sep. 19, 2023 (10 Pages).

*Primary Examiner* — Catherine A Kelly
(74) *Attorney, Agent, or Firm* — IceMiller LLP

(57) ABSTRACT

A door system comprises a door frame adapted to be mounted within an opening, a door pivotally attached to the door frame, an AC/DC converter configured to be electrically connected to an AC power unit operably associated with the door system, a slot in the door system, a pre-wired receptacle disposed in the slot, and an electric device removably disposed in the pre-wired receptacle and electrically connected to the AC/DC converter or the AC power unit through the electrical connector of the pre-wired receptacle.

9 Claims, 10 Drawing Sheets

(56) References Cited

U.S. PATENT DOCUMENTS

| | | | | |
|---|---|---|---|---|
| 5,212,907 | A * | 5/1993 | Van Sandt | H02G 11/00 439/31 |
| 6,259,352 | B1 * | 7/2001 | Yulkowski | E05C 17/56 70/277 |
| 7,824,200 | B2 | 11/2010 | Bryla et al. | |
| 8,156,671 | B2 | 4/2012 | Presley et al. | |
| 8,169,169 | B2 | 5/2012 | Hass et al. | |
| 8,294,302 | B2 | 10/2012 | Peabody et al. | |
| 8,337,039 | B1 | 12/2012 | Larkin | |
| 8,354,914 | B2 | 1/2013 | Buckingham et al. | |
| 8,772,970 | B2 | 7/2014 | Lambrou | |
| 9,290,966 | B2 | 3/2016 | Hanchett, Jr. | |
| 9,652,917 | B2 | 5/2017 | Johnson et al. | |
| 9,704,320 | B2 | 7/2017 | Johnson et al. | |
| 9,825,443 | B2 * | 11/2017 | Shah | H02G 3/0481 |
| 9,922,513 | B1 | 3/2018 | Hall et al. | |
| 10,024,096 | B2 | 7/2018 | Yulkowski et al. | |
| 10,037,636 | B2 | 7/2018 | Ho et al. | |
| 10,043,332 | B2 | 8/2018 | Scalisi et al. | |
| 10,361,880 | B1 * | 7/2019 | Marcinkowski | G07C 9/32 |
| 10,415,294 | B2 | 9/2019 | Yulkowski et al. | |
| 10,453,280 | B2 | 10/2019 | Kontturi | |
| 10,480,241 | B1 * | 11/2019 | Jude | E05G 1/08 |
| 10,664,688 | B2 | 5/2020 | Goulden et al. | |
| 10,691,953 | B2 | 6/2020 | Johnson et al. | |
| 10,733,823 | B2 | 8/2020 | Scalisi | |
| 10,755,509 | B2 | 8/2020 | Saeedi et al. | |
| 10,803,685 | B2 | 10/2020 | Marcinkowski et al. | |
| 10,818,118 | B2 | 10/2020 | Sivalingam et al. | |
| 10,927,591 | B1 | 2/2021 | Brychell | |
| 10,938,250 | B2 * | 3/2021 | Ahmed | G07C 9/30 |
| 10,950,076 | B1 | 3/2021 | Hall et al. | |
| 10,964,138 | B2 | 3/2021 | Geerlings et al. | |
| 10,997,547 | B2 | 5/2021 | Hall et al. | |
| 10,999,092 | B2 | 5/2021 | Marcinkowski et al. | |
| 11,085,226 | B2 * | 8/2021 | Honjo | G07C 9/37 |
| 11,174,666 | B2 | 11/2021 | Demele et al. | |
| 11,205,880 | B1 * | 12/2021 | Zhou | H01R 13/703 |
| 11,244,523 | B1 | 2/2022 | Brady et al. | |
| 11,248,410 | B2 | 2/2022 | Dreyer et al. | |
| 11,286,712 | B2 | 3/2022 | Macdonald et al. | |
| 11,290,298 | B2 | 3/2022 | Marcinkowski et al. | |
| 11,339,604 | B2 | 5/2022 | Dreyer | |
| 11,346,141 | B2 | 5/2022 | Gregoriou | |
| 11,346,150 | B1 * | 5/2022 | Johnston | A47G 29/141 |
| 11,352,812 | B2 | 6/2022 | Johnson | |
| 11,373,471 | B2 * | 6/2022 | Anderson | E06B 7/28 |
| D957,688 | S | 7/2022 | Kim et al. | |
| 11,388,373 | B2 | 7/2022 | Scalisi | |
| 11,403,899 | B2 | 8/2022 | Zhang | |
| 11,403,902 | B2 | 8/2022 | Ho et al. | |
| 11,417,200 | B2 | 8/2022 | Hass et al. | |
| 11,441,332 | B2 | 9/2022 | Johnson et al. | |
| 11,532,192 | B2 | 12/2022 | Hass et al. | |
| 11,536,078 | B2 | 12/2022 | Dreyer | |
| 11,539,794 | B1 | 12/2022 | Weber et al. | |
| 11,543,801 | B2 | 1/2023 | Hall et al. | |
| 11,655,669 | B2 | 5/2023 | Hutton et al. | |
| 11,694,287 | B2 | 7/2023 | Marcinkowski et al. | |
| 11,729,014 | B2 | 8/2023 | Marcinkowski et al. | |
| 11,739,583 | B2 * | 8/2023 | Sorice | H02J 7/0042 49/25 |
| 11,767,710 | B1 | 9/2023 | Johnston | |
| 11,879,285 | B2 * | 1/2024 | Sorice | E05B 47/00 |
| 12,197,097 | B2 * | 1/2025 | Agrawal | E06B 7/30 |
| 12,312,852 | B2 * | 5/2025 | Sorice | E05B 47/02 |
| 2009/0308116 | A1 | 12/2009 | Lambrou | |
| 2014/0020295 | A1 | 1/2014 | Bonahoom et al. | |
| 2014/0267739 | A1 | 9/2014 | Ibsies | |
| 2016/0163139 | A1 | 6/2016 | Kankkunen et al. | |
| 2016/0322847 | A1 | 11/2016 | Geiszler | |
| 2017/0040827 | A1 | 2/2017 | Weber | |
| 2017/0358952 | A1 * | 12/2017 | Butler | E06B 3/04 |
| 2019/0271186 | A1 | 9/2019 | Chen et al. | |
| 2019/0333302 | A1 | 10/2019 | Kagnew et al. | |
| 2020/0014552 | A1 | 1/2020 | Tan et al. | |
| 2020/0082240 | A1 | 3/2020 | Heitmar | |
| 2020/0349786 | A1 | 11/2020 | Ho et al. | |
| 2020/0378172 | A1 | 12/2020 | Lerpard | |
| 2021/0207419 | A1 * | 7/2021 | Sorice | E06B 3/825 |
| 2021/0207420 | A1 * | 7/2021 | Sorice | E05F 15/42 |
| 2021/0207421 | A1 * | 7/2021 | Sorice | H02J 7/0042 |
| 2021/0209878 | A1 | 7/2021 | Kim et al. | |
| 2022/0155005 | A1 | 5/2022 | Lee et al. | |
| 2022/0186543 | A1 | 6/2022 | Soderqvist | |
| 2022/0263297 | A1 * | 8/2022 | Bodurka | E06B 1/52 |
| 2022/0319264 | A1 * | 10/2022 | Anderson | H05K 7/02 |
| 2022/0351722 | A1 | 11/2022 | Mandry et al. | |
| 2022/0392287 | A1 | 12/2022 | Shen | |
| 2023/0062621 | A1 | 3/2023 | Cheung | |
| 2023/0141568 | A1 * | 5/2023 | Sivasankaran | E05B 47/0001 70/279.1 |
| 2023/0184022 | A1 | 6/2023 | Eliasson et al. | |
| 2024/0161562 | A1 * | 5/2024 | Anderson | G07C 9/00571 |
| 2025/0140046 | A1 * | 5/2025 | Fink | H04W 4/80 |

FOREIGN PATENT DOCUMENTS

| | | | |
|---|---|---|---|
| CN | 103606213 | A | 2/2014 |
| CN | 104105248 | A | 10/2014 |
| CN | 106761274 | A | 5/2017 |
| CN | 106836990 | A | 6/2017 |
| CN | 107191110 | A | 9/2017 |
| CN | 107448128 | A | 12/2017 |
| CN | 107575137 | A | 1/2018 |
| CN | 107610390 | A | 1/2018 |
| CN | 107643706 | A | 1/2018 |
| CN | 107705511 | A | 2/2018 |
| CN | 107730687 | A | 2/2018 |
| CN | 107747457 | A | 3/2018 |
| CN | 107795255 | A | 3/2018 |
| CN | 107829659 | A | 3/2018 |
| CN | 108118987 | A | 6/2018 |
| CN | 108389290 | A | 8/2018 |
| CN | 108399674 | A | 8/2018 |
| CN | 108412359 | A | 8/2018 |
| CN | 108442852 | A | 8/2018 |
| CN | 108661486 | A | 10/2018 |
| CN | 108756617 | A | 11/2018 |
| CN | 108868508 | A | 11/2018 |
| CN | 108915498 | A | 11/2018 |
| CN | 109098543 | A | 12/2018 |
| CN | 109138774 | A | 1/2019 |
| CN | 109236134 | A | 1/2019 |
| CN | 109236135 | A | 1/2019 |
| CN | 109267837 | A | 1/2019 |
| CN | 109472902 | A | 3/2019 |
| CN | 110009782 | A | 7/2019 |
| CN | 110264682 | A | 9/2019 |
| CN | 209429913 | U | 9/2019 |
| CN | 110409954 | A | 11/2019 |
| CN | 110505182 | A | 11/2019 |
| CN | 110531631 | A | 12/2019 |
| CN | 209990389 | U | 1/2020 |
| CN | 110778265 | A | 2/2020 |
| CN | 111173404 | A | 5/2020 |
| CN | 111270959 | A | 6/2020 |
| CN | 111343432 | A | 6/2020 |
| CN | 111441680 | A | 7/2020 |
| CN | 211038390 | U | 7/2020 |
| CN | 211124167 | U | 7/2020 |
| CN | 111505947 | A | 8/2020 |
| CN | 111540093 | A | 8/2020 |
| CN | 111653025 | A | 9/2020 |
| CN | 111764747 | A | 10/2020 |
| CN | 211851423 | U | 11/2020 |
| CN | 112096221 | A | 12/2020 |
| CN | 112211496 | A | 1/2021 |
| CN | 112267796 | A | 1/2021 |
| CN | 112330869 | A | 2/2021 |
| CN | 112491668 | A | 3/2021 |
| CN | 112539020 | A | 3/2021 |
| CN | 213205374 | U | 5/2021 |
| CN | 112901047 | A | 6/2021 |

(56) References Cited

FOREIGN PATENT DOCUMENTS

| | | | |
|---|---|---|---|
| CN | 113048374 | A | 6/2021 |
| CN | 113129476 | A | 7/2021 |
| CN | 113338772 | A | 9/2021 |
| CN | 113345130 | A | 9/2021 |
| CN | 113545639 | A | 10/2021 |
| CN | 113645446 | A | 11/2021 |
| CN | 113674454 | A | 11/2021 |
| CN | 113706744 | A | 11/2021 |
| CN | 214835862 | U | 11/2021 |
| CN | 214886488 | U | 11/2021 |
| CN | 214943492 | U | 11/2021 |
| CN | 215169563 | U | 12/2021 |
| CN | 113947834 | A | 1/2022 |
| CN | 217240775 | U | 8/2022 |
| CN | 217307315 | U | 8/2022 |
| CN | 115095246 | A | 9/2022 |
| CN | 115164381 | A | 10/2022 |
| CN | 115235096 | A | 10/2022 |
| CN | 115294675 | A | 11/2022 |
| CN | 115324428 | A | 11/2022 |
| CN | 115341821 | A | 11/2022 |
| CN | 115393988 | A | 11/2022 |
| CN | 218454661 | U | 2/2023 |
| CN | 115798084 | A | 3/2023 |
| CN | 116251221 | A | 6/2023 |
| CN | 219197192 | U | 6/2023 |
| CN | 219246122 | U | 6/2023 |
| CN | 116498183 | A | 7/2023 |
| CN | 116760602 | A | 9/2023 |
| CN | 117238059 | A | 12/2023 |
| DE | 202022101334 | U1 | 5/2022 |
| EP | 3118405 | A1 | 1/2017 |
| EP | 3537398 | A1 | 9/2019 |
| EP | 3845729 | A1 | 7/2021 |
| FR | 3132160 | A3 | 7/2023 |
| IN | 201921017138 | A | 5/2019 |
| IN | 201911049967 | A | 12/2019 |
| IN | 201911048995 | A | 5/2021 |
| IN | 202111053824 | A | 12/2021 |
| IN | 202241020116 | A | 4/2022 |
| IN | 202241026843 | A | 5/2022 |
| IN | 411059 | B | 11/2022 |
| IN | 202111013824 | A | 12/2022 |
| IN | 430120 | B | 4/2023 |
| IN | 202341019331 | A | 4/2023 |
| JP | 6680821 | B2 | 3/2020 |
| JP | 2020042440 | A | 3/2020 |
| JP | 6777955 | B2 | 10/2020 |
| KR | 20160025226 | A | 3/2016 |
| KR | 20160050965 | A | 5/2016 |
| KR | 20160123639 | A | 10/2016 |
| KR | 20160124481 | A | 10/2016 |
| KR | 101800514 | B1 | 12/2017 |
| KR | 20180076537 | A | 7/2018 |
| KR | 20180131716 | A | 12/2018 |
| KR | 101988851 | B1 | 6/2019 |
| KR | 20190098719 | A | 8/2019 |
| KR | 20190098720 | A | 8/2019 |
| KR | 102024754 | B1 | 9/2019 |
| KR | 102079532 | B1 | 2/2020 |
| KR | 102150642 | B1 | 9/2020 |
| KR | 20200143302 | A | 12/2020 |
| KR | 20210004253 | A | 1/2021 |
| KR | 20210016726 | A | 2/2021 |
| KR | 20210019211 | A | 2/2021 |
| KR | 20210019216 | A | 2/2021 |
| KR | 20210019218 | A | 2/2021 |
| KR | 20210019241 | A | 2/2021 |
| KR | 20210045195 | A | 4/2021 |
| KR | 20210072510 | A | 6/2021 |
| KR | 20210078199 | A | 6/2021 |
| KR | 102303254 | B1 | 9/2021 |
| KR | 102329035 | B1 | 11/2021 |
| KR | 102341883 | B1 | 12/2021 |
| KR | 20210153308 | A | 12/2021 |
| KR | 20220031428 | A | 3/2022 |
| KR | 102421708 | B1 | 7/2022 |
| KR | 20220113136 | A | 8/2022 |
| KR | 20220119878 | A | 8/2022 |
| KR | 102472384 | B1 | 12/2022 |
| KR | 102534826 | B1 | 5/2023 |
| TW | M627626 | U | 6/2022 |
| WO | 2013163124 | A1 | 10/2013 |
| WO | 2016032464 | A1 | 3/2016 |
| WO | 2016175910 | A1 | 11/2016 |
| WO | 2017024088 | A1 | 2/2017 |
| WO | 2018184450 | A1 | 10/2018 |
| WO | 2018184452 | A1 | 10/2018 |
| WO | 2018184453 | A1 | 10/2018 |
| WO | 2018184454 | A1 | 10/2018 |
| WO | 2019068021 | A1 | 4/2019 |
| WO | 2019162435 | A1 | 8/2019 |
| WO | 2022004989 | A1 | 1/2022 |
| WO | 2022010071 | A1 | 1/2022 |
| WO | 2022010072 | A1 | 1/2022 |
| WO | 2022010073 | A1 | 1/2022 |
| WO | 2022010074 | A1 | 1/2022 |
| WO | 2022020893 | A1 | 2/2022 |
| WO | 2022145966 | A1 | 7/2022 |
| WO | 2022263147 | A1 | 12/2022 |
| WO | 2023180427 | A1 | 9/2023 |

* cited by examiner

DOOR SYSTEM WITH OUTER DOOR FRAME PRE-WIRED WITH AC ELECTRICAL POWER FOR CONNECTION WITH DC POWER SUPPLY UNIT, AND RELATED METHODS OF USE, INSTALLATION, AND FABRICATION

CROSS REFERENCE TO RELATED APPLICATIONS

This application is a National Stage application of International Application No. PCT/US2023/022252, filed May 15, 2023, which claims the benefit of U.S. Provisional Application No. 63/341,450 filed May 13, 2022, both of which are incorporated by reference in its entirety herein.

BACKGROUND

Field

The present disclosure is directed to exterior or interior doors for residential or commercial buildings, such as for a home, apartment, condominium, hotel room or business. More particularly the present invention is directed to a power supply that is installed in the door frame or in the wall adjacent the door frame, so that the power connection to the door may be made sometime thereafter. Because power is initially installed proximate the door opening during initial construction, it is a relatively simple matter to then connect the power source to the door in order to provide a powered door suitable for smarthome use. The present disclosure is also directed to a door system comprising a prewired door provided with integrated electric devices plugged into or otherwise electrically connected to prewired receptacles, and sources of low- and/or high-voltage electrical power in order to provide power that may be used to operate the integrated electric devices.

Description of Related Art

Typical existing exterior or interior doors for residential or commercial buildings may have a number of electric devices (or components) mounted to the doors in order to provide desired functions, such as electronic access control, door state feedback, i.e., open/closed position vis-à-vis the jamb, an entry camera and/or audio communication, an electric powered door latch, an electric powered door lock, an auto open/close system, etc. Also, the market for exterior and interior doors has seen an increasing adoption of additional electric devices including video doorbells, smart locks, LED lighting, smart glass, fail safe electromechanical door closers, wireless connectivity electronics, etc. Each of these discrete electric and/or smart devices is typically an "add-on" to an existing installed door, functions within or on the existing door construction, and is usually powered separately with at least one battery that requires periodic replacement. Should the battery not be replaced, or charged regularly, then the electric device will not operate.

In addition, current electric devices are mounted to exterior or interior doors in a manner that can be unattractive and unpleasant to look at owing to respective design styles that are not compatible with the home décor or one with the other. The electric devices typically each have either one or more rechargeable battery packs or at least one non-rechargeable battery that must periodically be recharged or changed and have some type of weatherable housing that also may not initially match the appearance of the door and may fade or degrade in appearance over time.

While the commercial market, e.g., multi-tenant and mixed-use housing, hospitality, office, etc., has developed electrified door entry systems with electric strikes and door controller technologies, the adoption into the residential market has been limited. Existing residential door construction techniques focus on stile and rail construction and have not seen integration of power systems or integration of electric devices with an internal controller or "smart" door system.

Experience has shown that supplying power to a door, such as a prehung door requires the coordination of several crafts, such as an electrician to bring power to the door, the carpenter to install the door, a painter to paint the area, etc. Should the homeowner wish to retrofit or install a powered door after initial construction, then the coordination becomes more cumbersome and the installation costs increased, particularly if a power line needs to be brought to the door for supplying power to the door.

Therefore, the need exists for a door system, and method, designed for integration of electric and smart devices into the door system, pre or post-installation, post-installation serviceability of those devices, with power and data run to the door or around the door, or both, so that electric and data centric devices can be powered and data managed by a control system and the devices may be easily integrated into and powered/controlled from a central power supply and command controller without adversely impacting structural integrity, insulation and/or acoustic performance, energy efficiency, and aesthetics of the door system. Thus, improvements that may enhance performance and cost of door systems with electric and data driven devices are made possible.

SUMMARY

According to a first aspect of the present invention, there is provided a door system.

A pre-wired receptacle may be provided in the door system, which includes the door or the door frame.

As noted, the door system comprises a door frame adapted to be mounted within an opening, a door pivotally attached to the door frame, a power converter such as an AC/DC converter configured to be electrically connected to an AC power unit operably associated with the door system, a slot, a pre-wired receptacle disposed in the slot, and an electric device removably disposed in the pre-wired receptacle and electrically connected to the power or AC/DC converter through the electrical connector of the pre-wired receptacle. The pre-wired receptacle comprises an electrical connector electrically connected the supply or power or to the AC/DC converter.

According to a second aspect of the present invention, there is provided an entryway. The entryway comprises a door frame within an opening, a door pivotally attached to the door frame, an AC power supply operably associated with the door frame, a power converter such as an AC/DC converter operably associated with the door frame and electrically connected to the AC power supply, a DC power distribution system mounted to the door or door frame and electrically connected to the AC/DC converter, a plurality of DC electric devices mounted to the door or door frame and electrically connected to the DC power distribution system, a slot in the door, and a pre-wired receptacle disposed in the slot, the pre-wired receptacle comprising an electrical connector electrically connected to the DC power distribution system. At least one of the DC electric devices is removably mounted in the pre-wired receptacle and electrically connected to the AC/DC converter through the electrical connector of the pre-wired receptacle.

Other aspects of the invention, including apparatus, devices, methods, and the like which constitute parts of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings:

FIG. 9 is a perspective exploded view showing a header wiring mounting device.

DETAILED DESCRIPTION OF EXEMPLARY EMBODIMENTS

Figure 1:
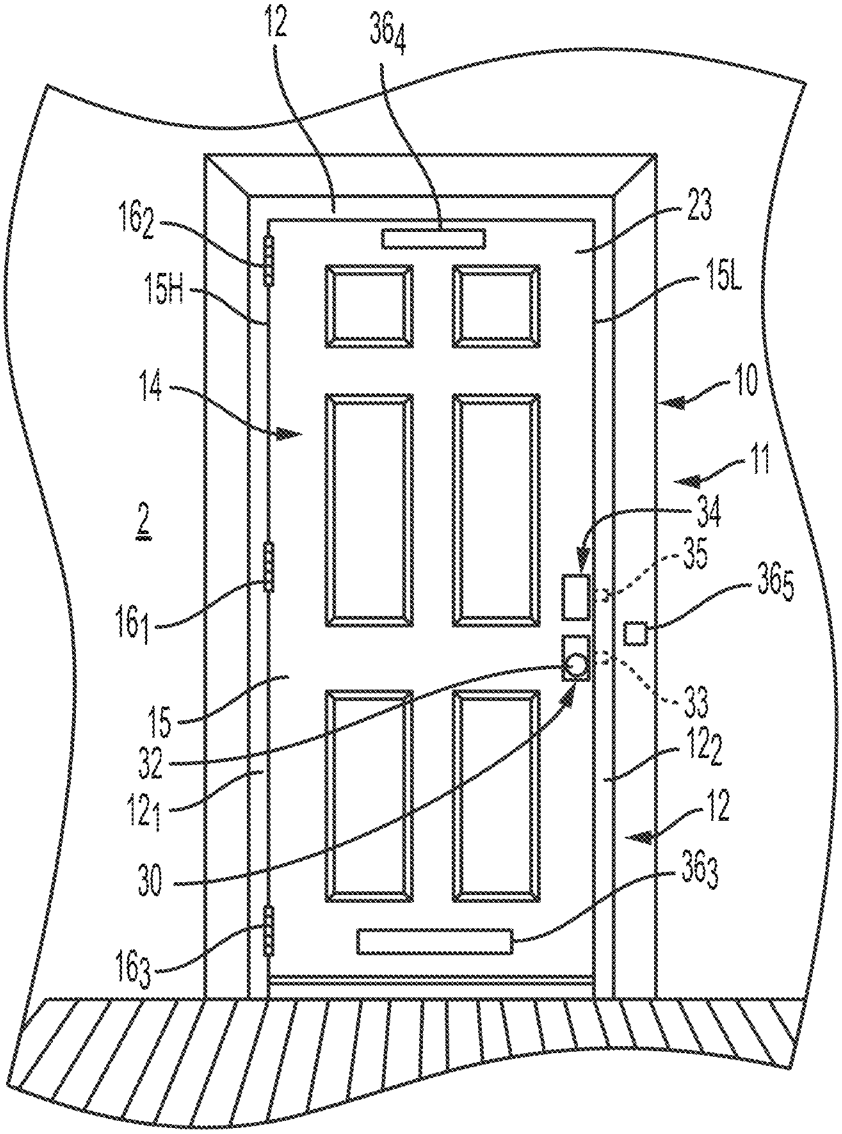
FIG. 1 is an elevational exterior view of an exterior door system according to an exemplary embodiment of the present invention.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as "horizontal," "vertical," "front," "rear," "upper", "lower", "top" and "bottom" as well as derivatives thereof (e.g., "horizontally," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

FIGS. 1-3A depict a door system 10 according to an exemplary embodiment of the present invention, such as a pre-hung exterior door pre-equipped with, or adapted to accept, smart and/or electrified component capability. That is, the door system 10 is "ready" for the separate or concurrent installation and connection of data and electrically operated devices associated with the door system 10. The door system 10 includes a conventional hinged residential exterior door assembly 11, but it should be understood that the door assembly 11 may be either an exterior or interior door assembly having a pivotal door provided for a residential or commercial building, such as a home, apartment, garage, condominium, hotel, office building, or the like. The door assembly 11 may be made of any appropriate material suitable for the purpose, such as wood, metal, wood composite material, plastic, fiberglass reinforced polymer composite or the like. The door assembly 11 includes a rectangular outer door frame (preferably residential outer door frame) 12, and a door 14 including a door slab 15 pivotally attached thereto by at least one hinge 16, such as a "butt hinge" that includes two leaves.

The door slab 15 has a width preferably ranging between 2'6"-3'6" and a height ranging from 6'5" to 8'3". The door 14 may be a single door unit, a door with sidelites, a double door, a double door with sidelites, inswing or outswing door, etc.

The outer door frame 12 includes first and second parallel, spaced apart vertically extending first (or hinge side) and second (or latch side) jamb members $\mathbf{12}_1$ and $\mathbf{12}_2$, respectively, and a horizontally extending upper jamb rail member or header $\mathbf{12}_H$ that connects upper ends of the first and second jamb members $\mathbf{12}_1$, $\mathbf{12}_2$. In view of the structural similarities of the first and second jamb members $\mathbf{12}_1$ and $\mathbf{12}_2$ and the header $\mathbf{12}_H$, and in the interest of simplicity, the following discussion will sometimes use a reference numeral $\mathbf{12}_M$ to designate an entire group of substantially identical jamb members.

Figure 2:
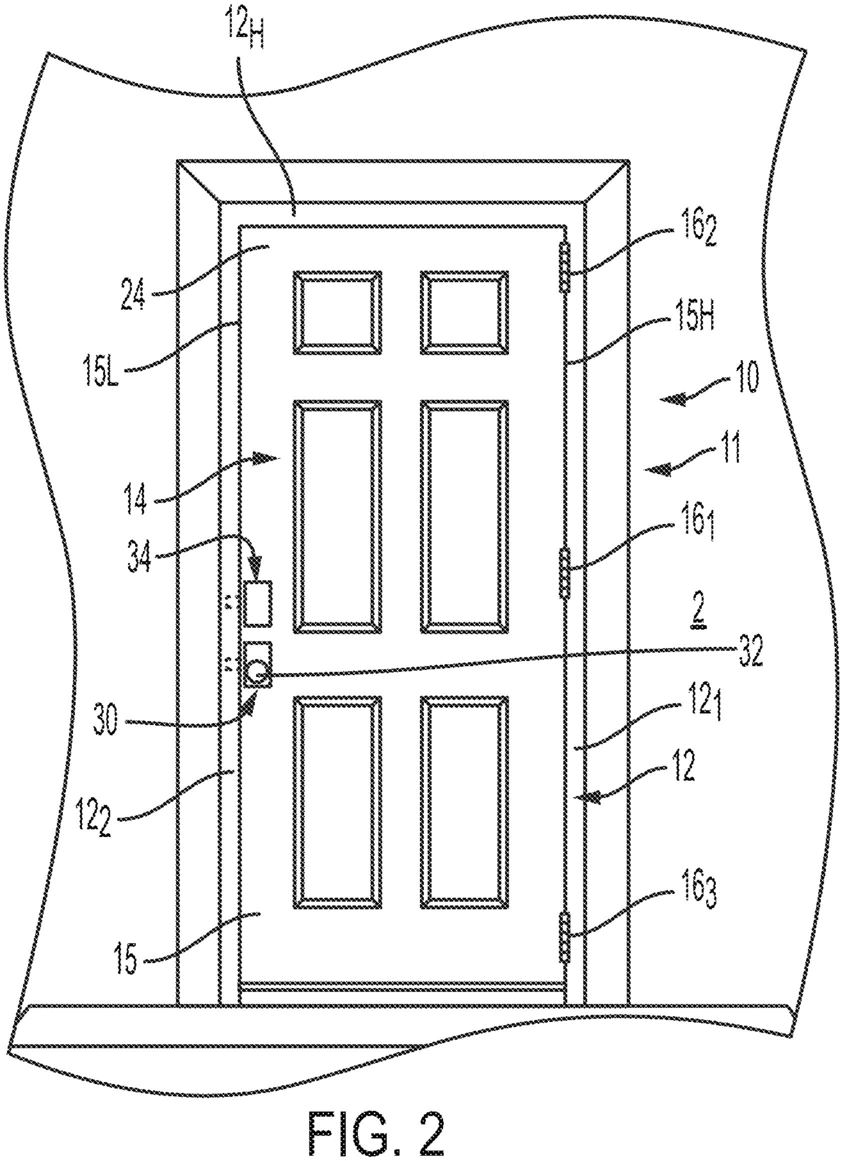
FIG. 2 is an elevational interior view of the door system according to the exemplary embodiment of the present invention.
Figure 3A:
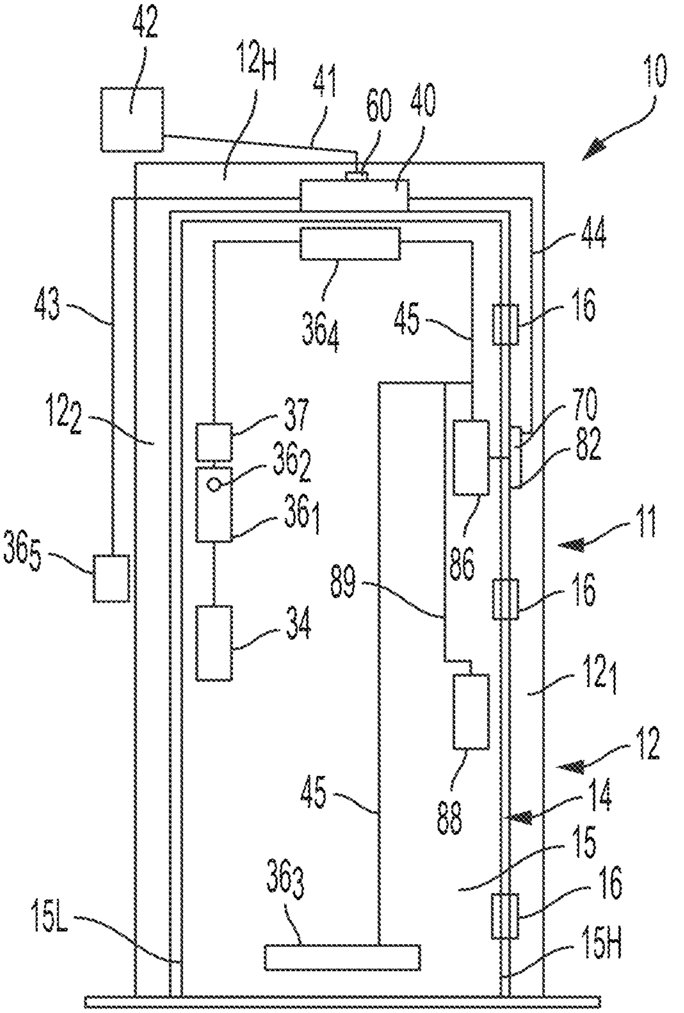
FIG. 3A is an elevational view of the door system according to the exemplary embodiment of the present invention without an exterior door skin in order to allow observation of the interior of the door.

The at least one hinge $\mathbf{16}_1$ pivotally attaches the door slab 15 to the first jamb member (or hinge side jamb) $\mathbf{12}_1$. Typically, at least two hinges $\mathbf{16}_1$ and $\mathbf{16}_2$ are provided to secure the door slab 15 to the first jamb member $\mathbf{12}_1$. Preferably, as best shown in FIGS. 2 and 3A, three hinges $\mathbf{16}_1$, $\mathbf{16}_2$, $\mathbf{16}_3$ are used to secure the door slab 15 to the outer door frame 12. In the interest of simplicity, the following discussion will sometimes use reference numeral 16 without a subscript numeral to designate an entire group of hinges.

For example, the reference numeral 16 will be sometimes used when generically referring to the hinges $\mathbf{16}_1$, $\mathbf{16}_2$ and $\mathbf{16}_3$.

The door slab 15 may be for exterior or interior doors for residential or commercial buildings. The exemplary door slab 15 includes a rectangular inner door frame 20, an exterior door skin (or facing) 23, and an interior door skin (or facing) 24, with the door skins 23, 24 secured to opposite sides of the inner door frame 20, as best shown in FIGS. 1 and 2. As used herein "exterior" indicates the side of the door that faces away from a room or house; and "interior" indicates the side of the door slab 15 that faces the interior of a room or house. The door slab 15 has a hinge side 15H mounted to the inner door frame 20 of the door slab 15 by the hinges 16, and a horizontally opposite latch side 15L.

The inner door frame 20 and the exterior and interior door skins 23, 24 of the door slab 15 surround an interior cavity, which may be hollow or may be filled with, for example, corrugated pads, foam insulation, or other core materials, if desired. Thus, the door slab 15 may include a core disposed within the inner door frame 20 of the door slab 15 between the exterior and interior door skins 23 and 24. The core may be formed from foam insulation, such as polyurethane foam material, cellulosic material and binder resin, corrugated pads, etc.

The door system 10 further comprises a number of DC (i.e., direct current) electric components (devices) mounted to the door slab 15 itself, the outer door frame 12 or adjacent the door slab 15 and the outer door frame 12 of the door system 10 to provide functions, such as electronic access control, door state feedback sensor(s), entry camera, ambient light sensor, and audio/video communication, etc. The electric devices that may be mounted to the smart ready door 14 of the door system 10 include, but are not limited to, an electric power door lock 34, a video doorbell $\mathbf{36}_1$, a digital camera $\mathbf{36}_2$, a threshold LED light $\mathbf{36}_3$, a door face illumination LED light $\mathbf{36}_4$, and an ambient light sensor 37, as illustrated in FIG. 3A.

The door system 10 also comprises a number of DC (i.e., direct current) electric devices that are mounted to the outer door frame 12 of the door system 10 that include, but are not limited to, a side jamb LED light $\mathbf{36}_5$, as illustrated in FIG. 3A. As further shown in FIG. 3A, the side jamb LED light $\mathbf{36}_5$ is mounted to the latch side jamb $\mathbf{12}_2$ of the door frame 12 adjacent to the power door lock 34 when the door 14 is closed.

The electric power door lock 34 is to be mounted to the inner door frame 20 of the door slab 15, while the video doorbell $\mathbf{36}_1$, the digital camera $\mathbf{36}_2$ and the door illumination LED light $\mathbf{36}_4$ may be mounted to the outer door frame 12 or to the door slab 15 of the door system 10, as best illustrated in FIG. 3A. Alternatively, the video doorbell $\mathbf{36}_1$, the digital camera $\mathbf{36}_2$, the threshold LED light $\mathbf{36}_3$ and/or the door face illumination light $\mathbf{36}_4$ may be mounted to the outer door frame 12 or even adjacent to the outer door frame 12 on a wall of the building. The threshold LED light $\mathbf{36}_3$ and/or the door illumination light $\mathbf{36}_4$ may illuminate when an authorized person is recognized or when a person approaches the door 14.

The power door lock 34 is operated at low-voltage DC electrical power. The DC electric devices $\mathbf{36}_1$-$\mathbf{36}_5$ typically are also low-voltage DC electric devices operated by low-voltage DC electrical power. Low voltage direct current (DC) is known in the art as 50 volts (V) or less. Common low voltages are 5 V, 12 V, 24 V, and 48 V. Preferably, the low-voltage DC electric devices $\mathbf{36}_1$-$\mathbf{36}_4$ are operated by the 12 VDC/3 A low-voltage DC electrical power. Low voltage/current is normally used for doorbells, video doorbells, garage door opener controls, heating and cooling thermostats, alarm system sensors and controls, outdoor ground lighting, household, and automobile batteries. Low voltage/current (when the source is operating properly) will not provide an aggressive shock from contact. Whereas a high current/voltage short circuit (automobile battery) can cause an arc flash and possible burns.

The door system 10 according to the present invention may include other electric devices, as there are a number of electric devices marketed to be mounted to doors and provide functions such as electronic access control, door state feedback, entry camera and communication, etc. In the interest of simplicity, the following discussion will sometimes use a reference numeral without a subscript numeral to designate an entire group of the electric devices. For example, the reference numeral 36 will be sometimes used when generically referring to the electric devices $\mathbf{36}_1$-$\mathbf{36}_5$.

The door 14 of the door system 10 further includes a door latch 30. As best illustrated in FIGS. 1 and 2, the door latch 30 includes a door handle 32, such as a doorknob or door lever, and a bolt 33 moveable between extended and retracted positions. The door handle 32 is manually operable by a user to retract the bolt 33 to allow opening of the door 14 from a closed position to an open position. Alternatively, the door handle 32 of the door latch 30 may be operable remotely, electrically, or touchless by a user. As best illustrated in FIGS. 1 and 2, the door latch 30 is mounted to the latch side 15L of the door slab 15. The door latch 30 may, for example, have a lighted doorknob (or handle) 32 and a lighted keyhole, which is illuminated when an authorized person is recognized or when a user approaches.

As further illustrated in FIGS. 1 and 2, the electric power door lock 34 is in the form of a deadbolt device, although other power locking systems may be utilized. The electric power door lock 34 includes a deadbolt 35 operable between an extended or locked position, which prevents opening of the door 14, and a retracted or unlocked position, which allows opening of the door 14. As best illustrated in FIGS. 1-3A, the electric power door lock 34 is mounted to the latch side 15L of the door slab 15.

Any sensor used in the invention is preferably suitably sealed to protect against water/dust ingress, for example, any installed peephole ferrule pulls tight to the door skin of the door 14.

Figure 4:
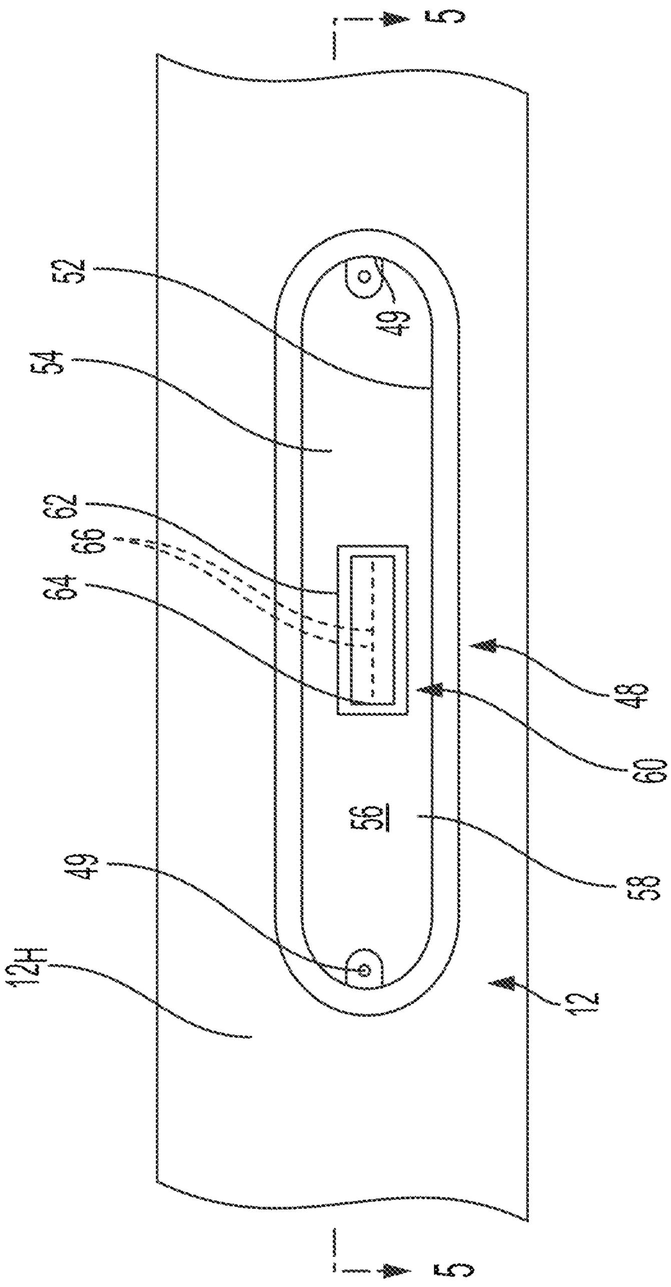
FIG. 4 is a partial elevational view of an edge of a header or side of an outer door frame.
Figure 5:
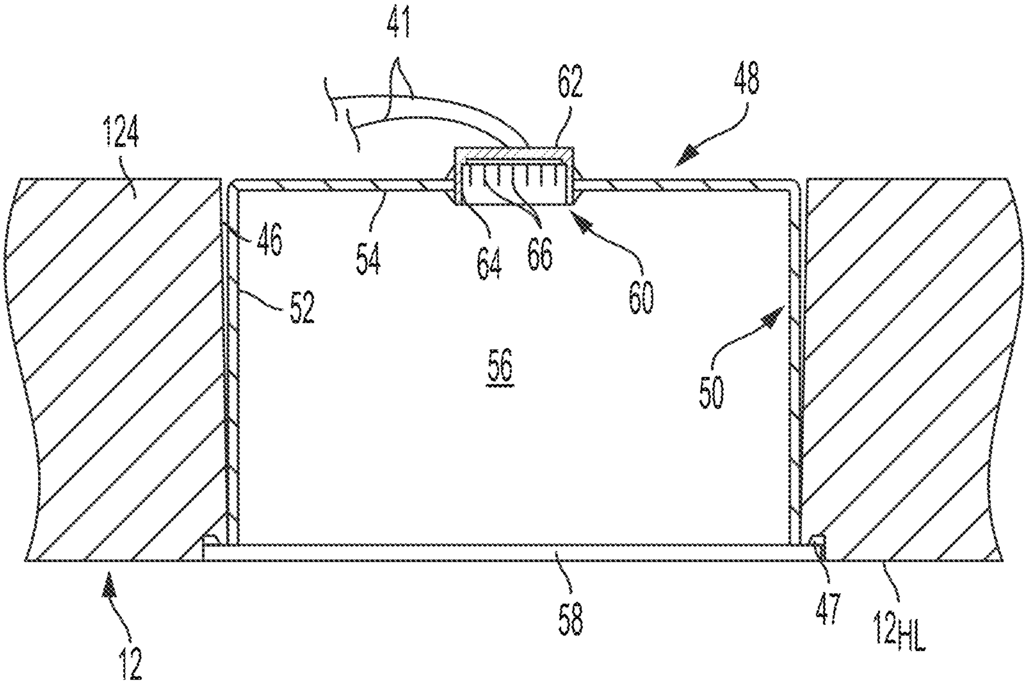
FIG. 5 is a cross-sectional view of the header of the outer door frame taken along the lines 5-5 in FIG. 4.

As illustrated in FIGS. 3A, 4 and 5, the door system 10 further comprises a DC power supply unit (PSU) 40 that includes a power converter (or transformer), such as AC to low-voltage (such as 5 volts (V), 12 volts, 24 volts or other required voltage, preferably 12 VDC/3 A) AC to DC (AC/DC) converter, shown mounted to the outer door frame 12. As best illustrated in FIG. 3A, the PSU 40 is disposed in the header $\mathbf{12}_H$ of the outer door frame 12. The PSU 40 is centered within the header $\mathbf{12}_H$ of the outer door frame 12. Locating the PSU 40 in the header $\mathbf{12}_H$ allows easy access for repairs and installation/re-location and provides protection from extreme temperatures for both inswing and outswing installations. Preferably, the transformer of the PSU 40 is low in height to allow it to be placed in the header, and requires no active cooling with, for example, the metal enclosure acting as a heat sink. Any such metal enclosure is electrically tied to earth and overall system ground to limit the voltage imposed by lightning, line surges, or unintentional contact with higher-voltage lines and to stabilize the voltage to earth during normal operation.

Alternatively, the PSU 40 may be located off center in the header $\mathbf{12}_h$ of the outer door frame 12. Further alternatively, the PSU 40 may be located elsewhere on the outer door frame 12, such as in the hinge side jamb $\mathbf{12}_1$ of the outer door frame 12. Preferably, the PSU 40 is located and securely mounted (i.e., without rattling or moving within the outer door frame 12) in a mounting slot (or pocket, opening) 46, machined or otherwise formed in the header $\mathbf{12}_h$ of the outer door frame 12, as best shown in FIG. 5, so that the PSU 40 is accessible from the outside for installation, repair or replacement. The PSU 40 is electrically connected by high voltage wires 41 to an AC power unit 42 (i.e., 85-265 VAC 50/60 Hz) installed during home construction or located adjacent the door assembly 11.

The AC power runs to the outer door frame 12 preferably during installation of the outer door frame 12 as part of a new home construction. Because the high voltage wires 41 are installed during initial construction, they either may be connected to AC power unit 42 during installation of the door 14 or afterwards.

Alternatively, the PSU 40 may, for example, be located at a standardized height on the first jamb member $\mathbf{12}_1$ of the outer door frame 12 so that the AC power unit 42 may be conveniently pre-installed during new home construction. Due to their close proximity, the PSU 40 and the AC power unit 42 may be easily electrically connected. Because the AC power unit 42 and PSU 40 are at a standardized height and/or location, factory manufacture of wall panels, etc. is simplified and so is connection therefrom with door 14.

Figure 3B:
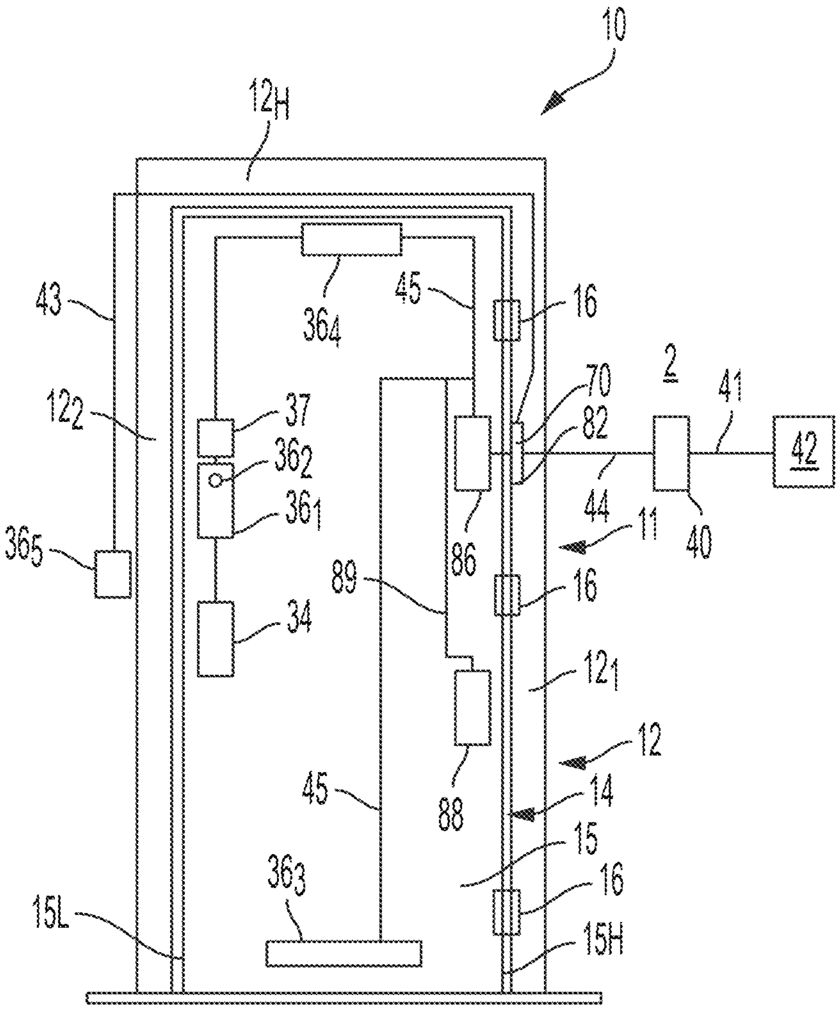
FIG. 3B is an elevational view of the door system according to an alternative exemplary embodiment of the present invention without an exterior door skin in order to allow observation of the interior of the door.
Figure 3C:
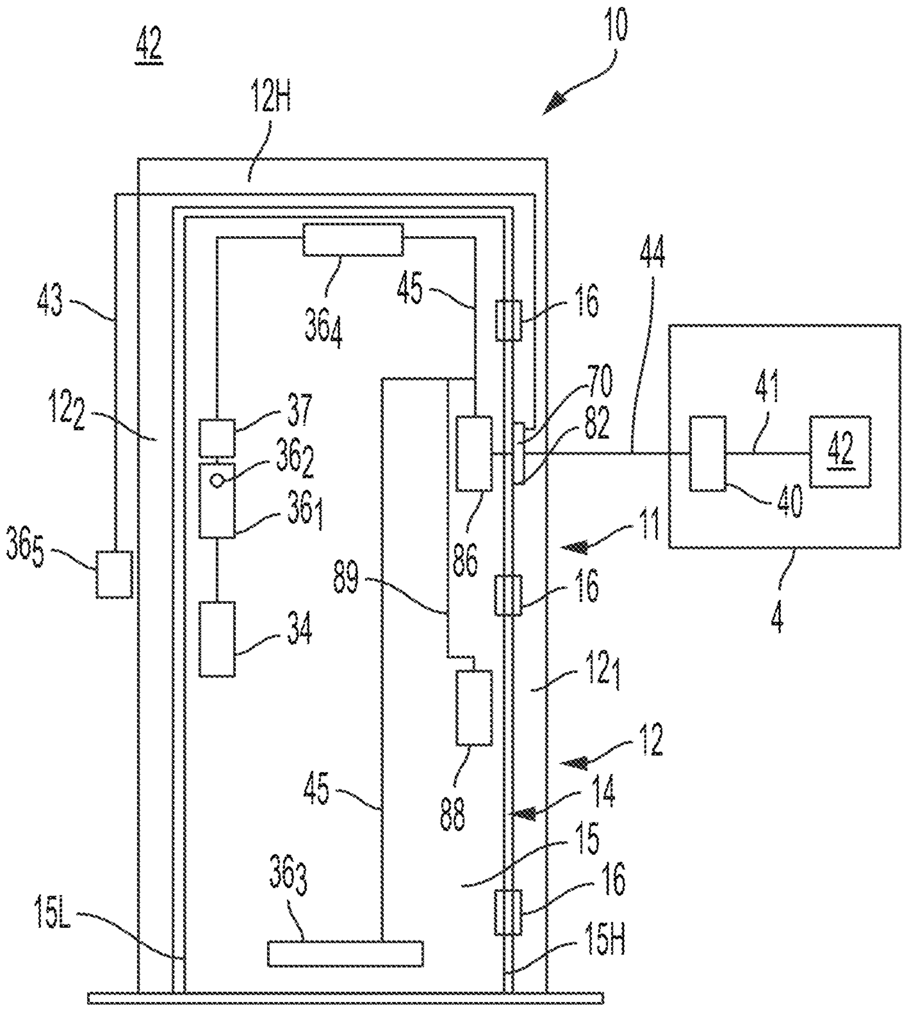
FIG. 3C is an elevational view of the door system according to a further alternative exemplary embodiment of the present invention without an exterior door skin in order to allow observation of the interior of the door.

Alternatively, the low voltage PSU 40 may be located outside the door assembly 11, such as within a wall 2 adjacent the outer door frame 12, as shown in FIG. 3B. Further alternatively, especially for a for new home construction, the low voltage PSU 40 may be located in a basement or attic, denoted by the reference numeral 4, and a low voltage wire 44 run to the outer door frame 12, as shown in FIG. 3C. An electrician is normally not needed to run low voltage wiring. The FIG. 3C alternative significantly reduces design requirements for the outer door frame 12, because the PSU 40 is not in the outer door frame 12.

Yet a further alternative is to install the AC power unit 42 during initial construction and run the electric lines to AC power unit 42. The AC power unit 42 may be deactivated, such as by being switched to an off position or the electric lines thereto simply terminated. Should the homeowner choose to have a powered door installed, then the PSU 40 may be connected to AC power supply 42 and power supplied to the door. If a powered door is not chosen, then the AC power supply 42 may remain deactivated. Should the homeowner later decide to install a powered door, then it is a relatively simple matter to connect a PSU 42 to AC power supply 42 and activate the AC power supply 42, so that power may then be supplied to the door. The PSU 42 may, for example, be connected by a plug to AC power supply 42 in that event.

The AC power unit 42 provides a source of high voltage (e.g., 120 (or 110) volts of a standard general-purpose alternating-current (AC) electrical power supply or a high voltage electrical power supply) disposed outside but adjacent to the door system 10. Typically, the standard 120 (or 110) volts general-purpose AC electrical power supply is known in the USA as grid power, wall power, or domestic power. Other voltages, such as 85-265 VAC 50/60 Hz, may be used. The PSU 40, after connection to the AC power unit 42, converts the standard general-purpose alternating-current (AC) high voltage of 120 VAC 60 Hz to the safe low voltage of 12 VDC/3 A, or other required voltage. Many electric devices operate at 5 volts DC or 12 volts DC, so the PSU 40 steps down the power and converts the current type to allow typical 120 (or 115) volts general-purpose AC electrical power to be available for use at the door system 10.

The header $\mathbf{12}_H$ of the outer door frame 12 is formed with the mounting slot 46, which may be machined or otherwise formed in the header $\mathbf{12}_H$ to allow mounting of the PSU 40, as best shown in FIGS. 4 and 5. Alternatively, the mounting slot 46 may be formed into one of the hinge side and lock side jambs $\mathbf{12}_1$ and $\mathbf{12}_2$ of the inner door frame 20. Moreover, the mounting slot 46 is open on an outer peripheral edge $\mathbf{12}_{HL}$ of the header $\mathbf{12}_H$ so as to face the door 14.

According to the exemplary embodiment of present invention, a pre-wired receptacle 48 is inserted into the mounting slot 46 in the header $\mathbf{12}_H$ of the outer door frame 12 as best shown in FIGS. 4 and 5, and fixed therein. The PSU 40 is configured to be releasably mounted in the pre-wired receptacle 48. Specifically, the PSU 40 can simply be removably (or releasably) plugged into the pre-wired receptacle 48 in the header $\mathbf{12}_H$ of the outer door frame 12, such as into the outer peripheral edge $\mathbf{12}_{HL}$ of the header $\mathbf{12}_H$ of the outer door frame 12. The pre-wired receptacle 48, best shown in FIGS. 4 and 5, comprises an insulated housing 50 having a continuous side wall 52 and a bottom wall 54 so as to define an open cavity 56 configured to receive the PSU 40 therein. The housing 50 of the receptacle 48 has an opening 58 through which the PSU 40 slides into the cavity 56 of the receptacle 48. As best shown in FIGS. 4 and 5, the prewired receptacle 48 opens on the outer peripheral edge $\mathbf{12}_{HL}$ of the header $\mathbf{12}_H$. The mounting slot 46 is provided with a trim mortise (or recess) 47 (best shown in FIG. 5) to accept a cover plate of the pre-wired receptacle 48 when not in use, with mounting holes 69 for either the PSU 40 or the cover plate.

The housing 50 of the receptacle 48 is molded from a flame retarded polymer or other suitable material that meets the necessary UL and regulatory requirements for housing electrical devices. Ventilation preferably is provided to aid in heat transfer, or a conduit may be connected to the receptacles 48 and vent air out a top of the header $\mathbf{12}_H$. The receptacle 48 further comprises an outlet type connector 60, such as a multi-pin electrical socket (or female end) connector 60 including a connector housing 62 defining a socket 64, and a plurality of pins 66 electrically connected to the PSU 40 through the high voltage wires 41. While a socket/pin system is shown, those skilled in the art will recognize that various other electrical connector systems, such as USB or HDMA, may be utilized to provide electric power to the PSU 40 and to allow data transmission through them.

According to the exemplary embodiment of present invention, the receptacle 48 is inserted into the slot 46 in the header $\mathbf{12}_H$ of the outer door frame 12 as best shown in FIGS. 4 and 5, and fixed therein. Preferably, the PSU 40 has a pin-hole electrical plug (or male end) connector complementary to the multi-pin socket connector 60. The pin-hole electrical plug connector of the PSU 40 includes a plurality of pin-holes complementary to the pins 66 of the multi-pin electrical socket connector 60. Alternatively, the receptacle 48 may comprise the pin-hole electrical plug connector, while the PSU 40 may comprise the multi-pin electrical socket connector. Other electrical connection mechanisms may also be utilized. Thus, the receptacle 48 is in the form of a small electrical box mounted in the header $\mathbf{12}_H$ with the outlet type connector 60, to which an electrician connects AC power from the AC power unit 42.

Accordingly, the electrical plug connector of the PSU 40 is removably (or detachably, releasably) connectable into the multi-pin electrical socket connector 60 of the receptacle 48 so that the high-voltage electric power can be supplied to the PSU 40 from the AC power unit 42. The PSU 40 thus can be easily installed (inserted) in the mounting slot 46 and plugged into the multi-pin electrical socket connector 60 of the associated receptacle 48 in the header $\mathbf{12}_H$ in such a manner that an electrician is not required, and a DIY person can easily plug the PSU 40 into the connector 60 of the receptacle 48.

The PSU 40 is electrically connected to the door 14 through an electric power transfer (EPT) device 70. In this embodiment, a low voltage power supply electrical wiring (or wire harness) 44 runs from the low voltage PSU 40 to the EPT device 70. In addition to provide power, the EPT device 70 also houses wires used to send data and electrical signals between devices mounted to the door slab 15, the outer door frame 12 or disposed outside the door assembly 11.

Figure 6A:
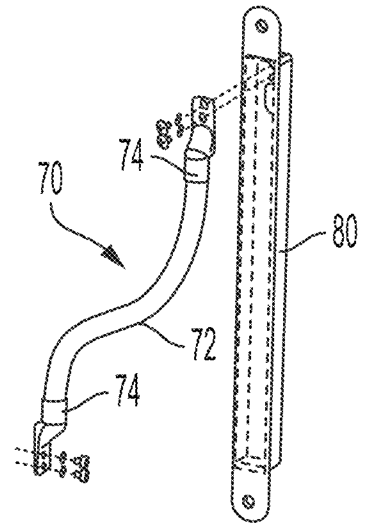
FIGS. 6A and 6B show an electric power transfer device.
Figure 6B:
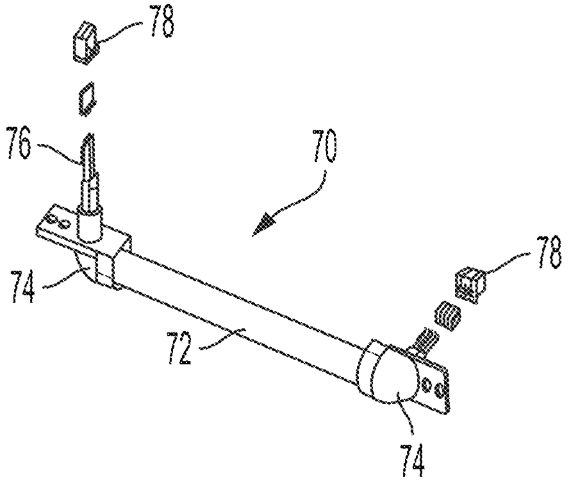

The EPT 70 according to the exemplary embodiment of the present invention, as illustrated in FIGS. 3A-3C, 6A and 6B, includes a flexible tube 72, end members 74 secured to opposite distal ends of the flexible tube 72, and an electrical box 80 configured to house the flexible tube 72, as best shown in FIGS. 6A and 6B. The flexible tube 72 is configured to be located in the electrical box 80 mounted in a pre-wired pocket 82 formed in the hinge side jamb 121 of the door frame 12, as best shown in FIGS. 3A, 6A and 6B, when the door 14 is closed, enabling the door 14 to swing open, and when shut, conceal and protect the EPT 70 within the electrical box 80 in the hinge side jamb $\mathbf{12}_1$ of the door frame 12.

Moreover, one of the end members 74 is attached to the electrical box 80 in the hinge side jamb $\mathbf{12}_1$ of the door frame 12 and the other end member 74 is attached to the door slab 15. The flexible tube 72 houses electric power and data wiring (or wire harness) 76 having terminal connectors 78 at opposite ends of the wire harness 76. The flexible tube 72 of the EPT 70 runs from the outer door frame 12 to the door 14. The terminal connector 78 of the end member 74 attached to the hinge side jamb $\mathbf{12}_1$ of the door frame 12 is connected to a complementary terminal connector of a distal end of the power supply electrical wiring 44.

Other exemplary electric power transfer devices with electrical flexible tubes are disclosed in U.S. Pat. Nos. 3,848,361, 4,445,299, 5,690,501, 8,448,382 and 8,505,169, the complete disclosures of which are incorporated herein by reference.

The term "wire harness", often referred to as a cable harness or wiring assembly, is known to those skilled in the art as a prefabricated assembly (or organized set) of electrical wires for transmitting electrical signals (data) or electrical power, which are bundled together with insulating material to keep the electrical wires organized. The wire harness has electrical terminals (or terminal connectors) configured to be attached to elements of an electrical system. The wire harness simplifies the connection to electrical components by integrating the wiring into a single unit for "drop-in" installation The electric wire harness 76 with the terminal connector 78 is configured to provide power and/or data from the PSU 40 to the electric devices mounted to the door 14 or the outer door frame 12 of the door assembly 11, and to send electrical signals (or data) between the electric devices mounted to the door 14, the outer door frame 12 or disposed outside the door assembly 11.

Figure 7:
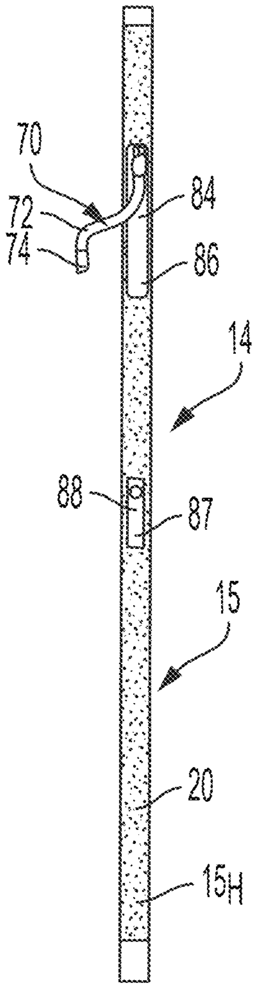
FIG. 7 is an edgewise view of the hinge edge of the door slab according to the exemplary embodiment of the present invention showing a main controller, a battery and an electric power transfer device mounted thereto.

As illustrated in FIG. 3A, the door 14 of the door system 10 also includes a main controller (or central electronic control unit (ECU), or power management controller) 86 configured to be programmed to receive input from one or more sensors, such as the ambient light sensor 37, a motion sensor (or motion detector), a proximity sensor, a smoke detector, and the like and send commands to the electric devices $\mathbf{36}_1$-$\mathbf{36}_4$, the electric power door lock 34, and also to the homeowner. The one or more sensors are wired to or in wireless communication with the main controller 86. As best shown in FIG. 7, the main controller 86 is mounted in a pocket (or recess) 84 formed in a hinge edge of the hinge side 15H of the door slab 15.

The main controller 86 includes printed circuit electrical boards (PCBAs), preferably automotive grade components that are suitable for high and low temperatures, and which are conformally coated to protect against moisture and dust particles. The main controller 86 sends commands to the electric devices 34 and/or $\mathbf{36}_1$-$\mathbf{36}_4$, and also to the homeowner. The main controller 86 preferably is an electronic controller having firmware and/or associated software suitable for assuring operation of the main controller 86 and its interaction with the electric devices 34, 36 and associated sensors, if any. Similarly, one or more sensors may be provided to not only turn-on the LED light(s) but allow the electric power door lock 34 to lock after determining that an individual has passed through the door 14 and the door 14 is closed, to communicate with a smartphone app to allow the owner to monitor activity around the door 14, to determine the status of the door 14, whether open or closed, and to determine whether someone is approaching the door 14.

The main controller 86 may be adapted and configured for communication with a remotely located controller, such as available through a smartphone app, for operating at least one of the DC electric devices 34, 36 and the sensors in response to a command from the remotely located controller. The main controller 86 may limit the use of certain electric devices to prolong the amount of time the door system 10 can operate while running on battery power.

As illustrated in FIG. 3A, the door system 10 further includes a low-voltage backup battery (or battery pack) 88 mounted to the door slab 15, such as to the inner door frame 20 thereof, and electrically connected to the power door lock 34 and the electric devices 36 as a back-up power supply. Preferably, the back-up battery 88 slides into a door edge slot 87 formed in the hinge edge of the hinge side 15H of the door slab 15. As the door edge slot 87 is for the battery 88, for example, the door edge slot 87 could be-metal on one side and insulation on the other, to allow heat to sink off the battery 88 and insulate it from exterior temperatures. The battery 88 may be equipped with a temperature sensor and heater which allows the system to keep the battery in a stable temperature range when exposed to extreme or low temperatures. When power is lost, the pre-heated battery automatically provides power until AC power is restored.

The battery 88 is electrically connected to the main controller 86 via a wiring 89. The battery 88 has a low nominal voltage (such as 5 volts (V), 12 volts or other required voltage). The nominal voltage of the back-up battery 88 corresponds to the output voltage of the PSU 40. The door system 10 may be powered and operated by the electric power of the battery 88 as a secondary back-up electrical power source for all of the powered devices in and/or around the door 14, for example, the power door lock 34 and the electric devices 361-364. Preferably, the battery 88 is a rechargeable battery that is charged from the PSU 40. Thus, in the door system 10, the reliance on batteries as a primary power source is less important, but if a battery option is used as a primary or only power source, a larger consolidated battery 88 may be stored in the door 14.

In use of the component ready door and frame, disclosed herein, the battery 88, the main controller 86, the sensors, the electric power door lock 34 and/or at least some of the electric devices are mounted into the edges of the latch side 15L of the door slab 15 in the prewired receptacles for integration, modularization, security, and serviceability. Alternatively, the main controller 86 may be mounted to the outer door frame 12 or disposed outside the door assembly 11, such as at the wall adjacent the outer door frame 12.

The main controller 86 is also a logic controller (i.e., is responsible for controlling the different features like LED lighting and connecting to the cloud thus indirectly connected to the app). The main controller 86 is electrically connected to the battery 88 to monitor the charge of the battery 88 and cause the battery 88 to be recharged should the charge fall below a predetermined level. The main controller 86 is in electrical or signal (Wifi, Bluetooth, 5G, NFC, <1 GHZ) communication with the various electric devices 34 and 36 and the sensors, receives data from the connected devices 34, 36 and the sensors, and supplies operating signals to them.

The main controller 86 is housed in a mechanical housing that protects and isolates the main controller from such forces as impact, shock, motion, and other forces seen in the appropriate function of a door system. The main controller 86 is also accessible through one or more buttons exposed on the exterior of the door. This allows for physical access to main controller's functions without needed to remove the main controller 86 from inside the door slab 15. These buttons could be used for power reset, radio enabling (e.g. Bluetooth), factory reset, or other such functions as needed for electric devices.

A plurality of connecting electrical wires, i.e., pre-installed power and data wiring or wiring harness 45, extends through a vertical supply passage within the door slab 15 and electrically connects the main controller 86 to the electric power door lock 34 and the electric powered devices $\mathbf{36}_1$-$\mathbf{36}_4$, thus electrically connecting the electric power door lock 34, and the electric devices $\mathbf{36}_1$-$\mathbf{36}_3$ to the PSU 40, as best shown in FIG. 3A. Alternatively, electrical connectors may be pre-mounted in the vertical supply passage at desired locations, so that the electric devices 36 may simply be inserted and plugged into pre-installed pockets with pre-positioned electrical connectors. A standard flange size and plug location relative to location of a flange of the electric devices 36 may be set so that suppliers may supply electric devices that are easily plugged into the door 14. The power supply electrical wiring 44 and the plurality of the connecting electrical wires 45 together define an electrical wire system (or power and data wiring), which is disposed within the door 14 and is electrically connected to the PSU 40 and to the DC electric devices 34 and $\mathbf{36}_1$-$\mathbf{36}_4$. The side jamb LED light $\mathbf{36}_5$ is electrically connected to the PSU 40 via a power and data wiring or wiring harness 43, which may be pre-installed in the outer door frame 12, and to the main controller 86 via the power and data wirings 43 and 45.

In the event the electric devices 36 have connectors for connection to the main controller 86, the connectors may have a flange or some other unique identifier to mate with a complementary receptacle in order to identify or designate the connector and thus its electric device 36 as approved for use with the door system 10. Alternatively, the electric devices 36 may have an electronic signature or some other identifier to assure that the electric device 36 is approved/compatible for installation. Yet alternatively, a digital certificate may be provided for the electric device 36 for authentication when the door assembly 10 is initially activated. The digital certificate, when authenticated, establishes that the electric device 36 is approved for installation on the door system 10. A software handshake is another verification mechanism that may be utilized for electric devices 36. While plug connectors may be utilized to connect the electric devices 36, other forms of electrical connectors may be used while assuring transfer of power, data and operating signals.

The door 14 according to the exemplary embodiment allows easy integration of the electric devices 36, the main controller 86 and the battery 88, while maintaining structural, insulation, noise attenuation, and aesthetic requirements of the door 14. Moreover, according to the exemplary embodiment, a number of door edge slots (or pockets), such as the slots 84 and 87, such as of up to 1.188" in width, are machined into the hinge side 15H of the door slab 15 to allow secure mounting (i.e., without rattling or moving within the door slab 15) of the electric devices $\mathbf{36}_1$-$\mathbf{36}_4$, the main controller 86, the battery 88, or other electric devices, such as the power door lock 34, as best shown in FIGS. 3A-3C. Similarly, some of the mounting slots, such as the slots 46 and 82 for mounting of the PSU 40 and the EPT 70, may be machined into the header $\mathbf{12}_H$ and the hinge side jamb $\mathbf{12}_1$ of the outer door frame 12.

The power supply electrical wiring 44 may be run from the PSU 40 to the EPT 70, and may be pre-mounted to the header $\mathbf{12}_H$ of the outer door frame 12, thus allowing the main controller 86 to be plugged-in so that electric power, data, and/or signals can be supplied for use and functioning of the electric devices 34, 36 and the sensors.

Figure 8:
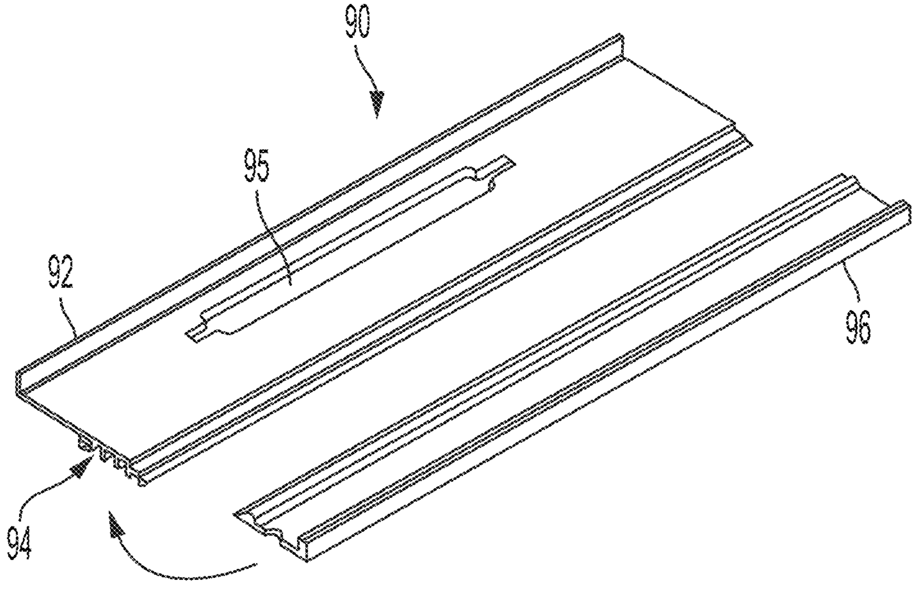

The door system 10 further comprises at least one wiring mounting device for mounting the power and data wiring on the outer door frame 12 of the door assembly 11, illustrated in FIG. 8. The door system 10 further comprises a header wiring mounting device 90 mounted to the header $\mathbf{12}_H$ of the outer door frame 12. The header wiring mounting device 90 includes a header base member 92 defining one or more wiring conduits (or channels) 94 and a snap-on protective cover 96, as best shown in FIG. 8. The header base member 92 is configured to be secured to the header $\mathbf{12}_H$.

Using the wiring conduits 94 as shown in FIG. 8, the household line power, i.e., 85-265 VAC 50/60 Hz, is routed into the header $\mathbf{12}_H$ of the outer door frame 12 where it connects to the PSU 40 installed in the mounting slot 46 in the header $\mathbf{12}_H$ through a slot 95 (best shown in FIG. 8) formed in the header base member 92 of the header wiring mounting device 90. The mounting slot 46 is machined or otherwise formed in the header $\mathbf{12}_H$ of the outer door frame 12. The wiring conduits 94 may also be used for routing the electrical wiring 44 into the header $\mathbf{12}_H$ of the outer door frame 12 where it connects to the EPT device 70.

The protective cover 96 may be easily pried off/opened to access the wiring harness and to provide good fit and trim appearance around wiring access points along the frame perimeter. In addition, the protective cover 96, itself, or short connector/replacement segments therefor, may be fit with, for example, LED lights or sensors/cameras that may directly tap into the underlying wiring contained in the wiring conduits 94. Wiring is then passed into the door 14 via the EPT device 70 to wire/cable routed around the inside(s) of stiles/rails of the inner door frame 20 of the door slab 15 before door assembly and foam injection. This wiring organization allows quick addition of jamb and/or door electrical and smart electrical components in the future as designs change and performance warrants. It also allows the door 14 to be easily disconnected from the outer door frame 12 in the event that a homeowner wishes to remove the door to allow more room for larger objects to be carried through the opening.

The wiring harness may be pre-mounted to the door slab 15 and/or outer door frame 12.

As noted, the door 14 can be constructed with multiple prewired receptacles where electric devices and/or the battery can simply be plugged into an edge of the door 14 and a cover plate installed to enclose the electric devices. A housing for each of the receptacles may be molded from a flame retarded polymer that meets the necessary UL and regulatory requirements for housing electric devices. The housing for each of the receptacles may be inserted into one of the slots machined or otherwise formed into the latch stile or hinge stile of the inner door frame 20. The housing might also be, as previously noted, wholly or partly made of a suitable metal, with or without holes, so as to create a "heat sink" effect or insulation effect for the installed item. For example, ventilation may be provided in a selected cover plate to aid in heat transfer, or a conduit may be connected to the receptacles and vent air out a top of the door 14.

In use of the component-ready door and frame, disclosed herein, the battery 88, the main controller 86, the sensors, the electric power door lock 34 and/or at least some of the electric devices are mounted into the edges of the latches of the door 14 in the prewired receptacles for integration, modularization, security, and serviceability. Alternatively, the power controller 86 may be mounted to the outer door frame 12 or disposed outside the door assembly 11, such as at the wall adjacent the outer door frame 12. The main controller 86 allows the electric power door lock 34 to be unlatched remotely, such as through a smartphone app, without the intervention of a person wishing to enter the building. To unlatch the door 14, the electric latch operator moves the central latch bolt 35 of the electric power door lock 34 by an electric motor associated with the electric latch operator of the electric powered door latch 30 into the retracted position. Thus, the main controller 86 with the data links define a power/data/control management system for the door system 10.

The powered outer door frame 12 is designed to incorporate the following features:

- the pre-wired receptacle (or electrical connection box) 48 to connect AC power to the outer door frame 12 at the time of installation in new construction;
- either the low-cost AC/DC converter 40 or capability to "plug-in" the converter 40 at a later day by a DIY homeowner, without the need for an electrician; to incorporate the low-cost power supply unit 40, the thicker than conventional header $\mathbf{12}_H$ of the outer door frame 12 is provided to enable the use of an off-the-shelf converter 40, requiring builders to increase its rough opening heights;
- pre-wired cable from the AC/DC converter 40 to a location in the jamb (preferably hinge side jamb $\mathbf{12}_1$) of the outer door frame 12 which can be accessed and connect a powered door slab 15 to by a DIY homeowner at a future date;
- preferably providing a connector for connection of the powered door slab; the connector allows transfer of low voltage DC current to the door slab 15 and/or transfer of data between the door and frame; this can be a physical electrical connector, or other means of connection such as contactors that contact when the door closes, an inductive transfer device, or other means of transferring power to the door slab and data between the frame and door slab;
- the outer door frame 12 is constructed with materials and fabrication techniques for cost efficient production and assembly at scale of >100,000 systems per year, the outer door frame 12 preferably consist of extruded composite material or profile extruded jambs that incorporate raceways for wiring in the production process with minimal machining required; the header $\mathbf{12}_H$ of the outer door frame 12 can also be produced via injection molding to enable near net shape, three dimensional production;
- the outer door frame 12 is designed to meet all structural, installation, and aesthetic requirements for residential door frames;
- standardized sizes and locations for hinges and latches so a homeowner can order a powered and connected slab in the future and install; the design may include a digital means for identification such as an RFID tag.

Such an outer door frame 12 incorporates capability to enable a DIY homeowner to install a new powered door slab at a future date, without the need for an electrician or other contractor, and lowers cost design for high volume production.

The PSU 40 can be easily installed (inserted) in the mounting slot 46 and plugged into the multi-pin electrical socket connector 60 of the associated receptacle 48 in the header $\mathbf{12}_H$ in such a manner that an electrician is not required, and a DIY person can easily plug the PSU 40 into the connector 60 of the receptacle 48. Cable connecting the DC voltage output from the PSU 40 to a standard connector in the inner door frame 20 that will enable connection of a powered door by a homeowner at a later time.

A method of manufacturing the residential door 14 for use with the outer door frame 12 comprises the following steps. First, the inner door frame 20 and the first door skin 23 assembled thereon is provided. The inner door frame 20 may have a conduit formed by the wiring groove on outer or inner edges thereof. Next, the wire harness is positioned about the wiring grooves. The wire harness has a first end on an exterior surface of the door 14 and a second end remote from the door 14. After that, the second door skin 24 is positioned and secured on an opposite surface of the inner door frame 20, thereby creating an opening between the door skins 23, 24. Then, an expandable foam is introduced into the opening between the door skins 23, 24. Next, the expandable foam is foamed within the opening, thus creating a door core.

The method of manufacturing the exterior residential door 14 also comprises the step of machining or otherwise forming the pockets (or slots) 84 and/or 87 in the inner door frame 20 for receiving an electric device therein. The wire harness is protected during the machining and manufacturing process, such as by a wire lock tube. The method of manufacturing the residential door 14 further comprises the step of testing electrical quality of the door system 10 by testing the power supply unit 40, the main controller 86, the electric devices 34, 36 and the wire harness by utilizing a secure Bluetooth connection and testing protocol.

The door system 10 can be configured by a user to enable both local and cloud integration and data storage. Specific examples where a user can configure setting of the door system 10 include:

- using motion, ambient light, or door state sensors to turn on LED lighting, such as the hallway illumination light $\mathbf{36}_4$ or the jamb LED light $\mathbf{36}_5$;
- using motion, ambient light, or door state sensors to control the electric power door lock 34;
- using connected door lock sensors and video sensors to detect a user to unlock the door 14;
- using door state sensor changes to activate home automation sequences, such as turning on interior lighting or for an announcement of occupancy; and using motion or ambient light sensors as a trigger for a smart glass of the door 14 to turn opaque for privacy and solar light management.

Those skilled in the art will recognize that the sensors communicating with the main controller 86 may be located on the building, the outer door frame 12 and/or the door 14 provided they are in communication with the main controller 86.

Also, the main controller 86 may notify a user that securing the power door lock 34 is not possible due to the door 14 being ajar or open. For this purpose, the door state sensor (or door sensor) communicates with the main controller 86 via a wired or wireless connection. The door state sensor monitors if the door 14 is ajar or closed (i.e., if the door 14 is properly aligned with the outer frame assembly 12) prior to activating the power door lock 34. One or more sensors may be provided to not only turn-on the LED light(s) but allow the electric powered door lock 34 to lock after determining that the individual has passed through the door 14 and the door 14 is closed, to communicate with a smartphone app to allow the owner to monitor activity around the door 14, to determine the status of the door 14, whether open or closed, and to determine whether someone is approaching the door 14.

The main controller 86 may work both locally amongst the electric devices 36, as well as be supplemented by cloud integration for more advanced control while the user is away from the home controller. In the door system 10, a user may access the power system of the door system 10 via a wireless connection or a PC or mobile device, such as through a smartphone app, to set up, configure and manage one or more powered electric devices 36. Moreover, a user may access data and have user settable options for both addition of electric devices as well as the diagnostic health of the attached electric devices 36 and/or the battery 88 that would be a more efficient method to service issues arising with the electric devices 36 and the battery 88. The smartphone app may be used to monitor activity around the door 14, to activate the power door lock 34 lock to lock and unlock, and to determine the status of the door 14, whether open or shut.

Therefore, a pre-wired smart ready door assembly 10 according to the present invention may include a power system and a door power management system with the ability to provide both high-voltage and low-voltage electrical power for operation of a plurality of electric devices and a power/data management controller integrated into the door assembly 11. For the plurality of electric devices integrated in the door assembly 11, the range of watts required, considering amperes and volts specifically required by each of the electric devices and use, varies widely from LED lighting at the low end, 2.9 watts per foot at 5 volts, to electromechanical door systems requiring extremely high amp output to move a door, typically over 500 watts at 120 (or 115) volts. Thus, the present invention provides two or more power supply options that better match power needs of electric devices to allow for easier integration and power management given the diversity of power requirements.

In the door systems described and enabled herein, a user may access the power system of the door systems via wireless connection and a PC or mobile device, such as through a smartphone app, to set up, configure and manage one or more powered connected electric devices 36. The smartphone app may be used to monitor activity around the door, to activate the electric powered door lock 34 to lock and unlock, and to determine the status of the door, whether open or shut. Moreover, a user may access data and have user settable options for both addition of electric devices as well as the diagnostic health of the attached electric devices and/or the battery that would be a more efficient method to service issues with the electric devices and the battery.

By providing a convenient way to integrate the electric devices (hardware) into the door assembly with power/data readily available, manufacturers of the electric devices can simplify the designs and provide consumers with cleaner designs that are hidden and integrated into the door and do not require replacement of batteries. Furthermore, the invention enables integration of the electric devices into the door assembly in a standardized way that allows convenient serviceability of the electric devices. Embedding these devices into the door also protects against theft of the electric devices.

The installed electric devices are "integrated" into the pre-wired door assembly according to the present invention so that the door maintains structural integrity, insulation performance, and is free of distortion or other aesthetic defects.

In other exemplary embodiments, the pre-wired receptacle can be provided in the door, wherein the wiring of the pre-wired receptacle connects to the AC/DC converter (and in some cases wherein the receptacle is provided in a slot in the door system, door, etc.), as in co-owned U.S. patent application Ser. No. 17/142,467, the entire contents of which are incorporated herein by reference.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

The invention claimed is:

1. A door system, comprising:

a door frame adapted to be mounted within an opening;

a door pivotally attached to the door frame;

an AC/DC converter configured to be electrically connected to an AC power unit operably associated with the door system;

a slot in the door system;

a pre-wired receptacle disposed in the slot, the pre-wired receptacle comprising an electrical connector electrically connected the AC/DC converter or the AC power unit; and an electric device removably disposed in the pre-wired receptacle and electrically connected to the AC/DC converter through the electrical connector of the pre-wired receptacle.

2. The door system of claim 1, wherein the electrical connector comprises one of a plug connector and socket connector.

3. The door system of claim 2 wherein the slot is formed in the door.

4. The door system of claim 3, wherein the door comprises an inner door frame including top and bottom rails and first and second stiles, and wherein the slot is formed in one of the stiles or rails.

5. The door system of claim 1, wherein the slot is provided in the door frame.

6. The door system of claim 1, wherein the electric device is a DC electric device comprising one of a powered lock, a sensor, a door state sensor, a LED, a video camera, a lighted key hole, and a video camera.

7. The door system of claim 1, wherein:

a plurality of pre-wired receptacles are formed in the door and/or door frame, each of the receptacles has a connector and is in electrical connection with the AC/DC converter, and a plurality of DC electric devices, each of the DC electric devices releasably mounted within one of the receptacles and in electrical connection with the AC/DC converter through the associated connector.

8. The door system of claim 7, wherein at least one of the receptacles is formed in a peripheral edge of the door and at least one of the receptacles is formed in a surface of the door and/or door frame.

9. The door system of claim 8, wherein the DC electric device comprises one of a powered lock, a sensor, a door state sensor, a LED, a video camera, a lighted key hole, and a video camera.

* * * * *